United States Patent
Bilicki et al.

(10) Patent No.: US 9,280,777 B2
(45) Date of Patent: Mar. 8, 2016

(54) OPERATIONS DASHBOARD

(75) Inventors: Erik Bilicki, Saint Michael, MN (US); Rebecca Roeder, Blaine, MN (US)

(73) Assignee: Target Brands, Inc., Minneapolis, MN (US)

( * ) Notice: Subject to any disclaimer, the term of this patent is extended or adjusted under 35 U.S.C. 154(b) by 1239 days.

(21) Appl. No.: 12/555,392

(22) Filed: Sep. 8, 2009

(65) Prior Publication Data

US 2011/0061013 A1 Mar. 10, 2011

(51) Int. Cl.
*G06Q 10/06* (2012.01)
*G06Q 30/02* (2012.01)

(52) U.S. Cl.
CPC ............... *G06Q 30/02* (2013.01); *G06Q 10/06* (2013.01); *G06Q 10/06393* (2013.01)

(58) Field of Classification Search
CPC ............... G06Q 10/06393; G06Q 10/06375; G06Q 10/0639; G06Q 10/06; G06Q 30/02; G06F 17/30592
USPC .................................................. 715/771–772
See application file for complete search history.

(56) References Cited

U.S. PATENT DOCUMENTS

| | | | | |
|---|---|---|---|---|
| 4,937,742 A * | 6/1990 | Marshall | | 705/14.36 |
| 5,991,733 A * | 11/1999 | Aleia et al. | | 705/7.13 |
| 6,236,980 B1 * | 5/2001 | Reese | | G06Q 30/02 705/26.1 |
| 6,996,569 B1 | 2/2006 | Bedell et al. | | |
| 7,039,871 B2 * | 5/2006 | Cronk | | 715/741 |
| 7,236,940 B2 | 6/2007 | Chappel | | |
| 7,269,569 B2 * | 9/2007 | Spira et al. | | 705/7.36 |
| 7,366,685 B2 * | 4/2008 | Emerick | | G06F 9/5011 705/26.41 |
| 7,380,213 B2 * | 5/2008 | Pokorny et al. | | 715/764 |
| 7,499,922 B1 * | 3/2009 | Shiverick et al. | | |
| 7,684,993 B2 * | 3/2010 | McCullagh | | G06Q 10/06 705/1.1 |
| 2002/0087686 A1 * | 7/2002 | Cronk | | 709/225 |
| 2002/0099598 A1 * | 7/2002 | Eicher et al. | | 705/11 |
| 2002/0128956 A1 * | 9/2002 | Mendizabal et al. | | 705/37 |
| 2002/0133385 A1 * | 9/2002 | Fox et al. | | 705/7 |
| 2003/0144868 A1 * | 7/2003 | MacIntyre et al. | | 705/1 |
| 2004/0001103 A1 * | 1/2004 | Fliess et al. | | 345/810 |

(Continued)

OTHER PUBLICATIONS

'The 5 Styles of Business Intelligence: Industrial-Strength Business Intelligence', A White Paper prepared by MicroStrategy, Inc. Copyright 2002.

(Continued)

*Primary Examiner* — Amy Ng
*Assistant Examiner* — William Wong
(74) *Attorney, Agent, or Firm* — Merek, Blackmon & Voorhees, LLC

(57) ABSTRACT

An operations dashboard may be used to present recommended solutions to various challenges faced by a retail store that is part of an enterprise. In some implementations, a metrics engine may be used to track and diagnose challenges related to various performance metrics, such as inventory, pricing, customer satisfaction, and the like at one or more of the enterprise's retail store locations. The operations dashboard may, in certain embodiments, display one or more of the retail stores along with their corresponding diagnosed business challenges. A knowledge engine may be used to identify one or more solutions to the diagnosed business challenges, and the solutions may also be displayed on the dashboard. In some implementations, each of these solutions may have a corresponding recommendation score relating to the expected efficacy of the solution to solve the challenge.

20 Claims, 6 Drawing Sheets

(56) References Cited

U.S. PATENT DOCUMENTS

| | | | |
|---|---|---|---|
| 2004/0100493 A1* | 5/2004 | Reid et al. | 345/745 |
| 2004/0128611 A1* | 7/2004 | Reid et al. | 715/500 |
| 2004/0138934 A1 | 7/2004 | Johnson et al. | |
| 2005/0021733 A1* | 1/2005 | Clinton | G06F 11/008 709/224 |
| 2005/0071737 A1* | 3/2005 | Adendorff et al. | 715/500 |
| 2005/0131754 A1* | 6/2005 | Chapman et al. | 705/10 |
| 2005/0195966 A1* | 9/2005 | Adar et al. | 379/266.08 |
| 2005/0216831 A1* | 9/2005 | Guzik et al. | 715/513 |
| 2005/0273377 A1* | 12/2005 | Ouimet et al. | 705/10 |
| 2006/0085255 A1* | 4/2006 | Hastings | G06Q 30/02 705/14.4 |
| 2006/0095317 A1* | 5/2006 | Brown et al. | 705/11 |
| 2006/0149604 A1* | 7/2006 | Miller | 705/4 |
| 2006/0161471 A1* | 7/2006 | Hulen et al. | 705/10 |
| 2006/0206374 A1* | 9/2006 | Asthana et al. | 705/11 |
| 2006/0229931 A1* | 10/2006 | Fligler et al. | 705/10 |
| 2006/0242035 A1* | 10/2006 | Corbett et al. | 705/34 |
| 2006/0287911 A1* | 12/2006 | Laberge | G06Q 10/0633 705/7.27 |
| 2007/0022026 A1* | 1/2007 | Davidson | G06Q 20/207 705/31 |
| 2007/0112607 A1* | 5/2007 | Tien et al. | 705/7 |
| 2007/0175992 A1* | 8/2007 | Brown | 235/385 |
| 2007/0185751 A1* | 8/2007 | Dempers | 705/7 |
| 2007/0239464 A1* | 10/2007 | Carroll | G06Q 10/10 705/300 |
| 2008/0163099 A1* | 7/2008 | Gu et al. | 715/780 |
| 2008/0168376 A1* | 7/2008 | Tien et al. | 715/772 |
| 2008/0172629 A1* | 7/2008 | Tien et al. | 715/771 |
| 2008/0184130 A1* | 7/2008 | Tien et al. | 715/745 |
| 2008/0306821 A1* | 12/2008 | Fell et al. | 705/14 |
| 2009/0018879 A1* | 1/2009 | Flaxer et al. | 705/7 |
| 2009/0089709 A1* | 4/2009 | Baier et al. | 715/817 |
| 2009/0177988 A1* | 7/2009 | Martins | 715/764 |
| 2009/0319931 A1* | 12/2009 | Hutchings et al. | 715/771 |
| 2010/0023362 A1* | 1/2010 | Nguyen et al. | 705/7 |
| 2010/0125912 A1* | 5/2010 | Greenshpon et al. | 726/25 |
| 2010/0274637 A1* | 10/2010 | Li et al. | 705/11 |
| 2010/0289652 A1* | 11/2010 | Javey et al. | 340/605 |
| 2010/0318200 A1* | 12/2010 | Foslien et al. | 700/83 |

OTHER PUBLICATIONS

'Meeting the needs of your organization with IBM Cognos 8 Business Intelligence', *Cognos an IBM Company*, Sep. 2008, pp. 1-10.

'Picturing Performance: Dashboards and Scorecards with Cognos' *Cognos an IBM Company*, Feb. 2008, pp. 1-19.

Mosimann, Roland, Mosimann, Patrick and Dussault, Meg, 'The Performance Manager-Proven Strategies for Turning Information into Higher Business Performance' *Cognos Incorporated*, copyright 2007, pp. 1-146.

'Talking 'Bout a Revolution' *QlikTech*, copyright 2005, pp. 1-2.

'Data Mining with MicroStrategy' *MicroStrategy Best in Business Intelligence*, copyright 2005, pp. 1-20.

'MicroStrategy Dynamic Enterprise Dashboards' *MicroStrategy Best in Business Intelligence*, copyright 2007, pp. 1-35.

'Monitor. Manage. Perform' *Cognos an IBM Company*, Feb. 2008, pp. 1-12.

'IBM Cognos 8 Business Intelligence Reporting—Meet all your reporting requirements' *Cognos an IBM Company*, copyright 2008, pp. 1-4.

'Qlik View-Next Generation Business Intelligence-Technical Overview White Paper' *QlikView*, date unknown, pp. 1-30.

'QlikView Reference Manual' Jun. 2008, pp. 1-1370.

\* cited by examiner

OPERATIONS DASHBOARD

BACKGROUND

Many companies today collect large quantities of information about their business. Information relating to financial data, inventory, personnel, workflow, productivity, and countless other aspects of a company's business can be collected and stored in databases, data warehouses, or other data management systems for subsequent retrieval and analysis. For example, a company's finance department may track and maintain information related to revenues, profits, projected and actual budgets, operating costs, cash flow, payroll, and the like.

The business data gathered by a company may be aggregated and organized for viewing in a variety of different formats. Examples of such formats may include tables, spreadsheets, diagrams, portals, shared network drives, intranet pages, and the like. The information presented in these formats may often be summarized or distilled down into smaller, more manageable sets of information that can be analyzed for various purposes. Using the finance department example, a finance manager may be interested in viewing the company's monthly spending reports for the current year as compared to the corresponding reports from the previous year. This information may be gathered from one or more financial databases, formatted into a table or another appropriate format, and presented to the finance manager for review.

One type of business portal that may be used to display a company's business information is known as a digital dashboard. Digital dashboards can present a single graphical interface to show different types of information pulled from a number of different internal and/or external resources. For example, a digital dashboard may be used to request information from a backend system that stores operating costs, and to locate information in a separate relational database that contains revenue information, and both the operating cost information and the revenue information can be displayed to a financial analyst via the dashboard.

SUMMARY

An operations dashboard may be used to present recommended solutions to various challenges faced by an enterprise. In some implementations, a metrics engine may be used to track and diagnose challenges related to various performance metrics, such as inventory, pricing, customer satisfaction, and the like at one or more of the enterprise's retail store locations. The operations dashboard may, in certain embodiments, display one or more of the retail stores along with their corresponding diagnosed business challenges. A knowledge engine may be used to identify one or more solutions to the diagnosed business challenges and the solutions may also be displayed on the dashboard. In some implementations, each of these solutions may have a corresponding recommendation score relating to the expected efficacy of the solution to solve the challenge. Such recommendation scores may, according to various embodiments, be calculated based on the projected likelihood of the solution to solve the challenge and/or the projected cost to implement the solution.

The details of one or more implementations are set forth in the accompanying drawings and the description below. Other features and advantages will be apparent from the description, drawings, and the claims.

DESCRIPTION OF DRAWINGS

Like reference symbols in the various drawings indicate like elements.

DETAILED DESCRIPTION OF ILLUSTRATIVE EMBODIMENTS

Figure 1:
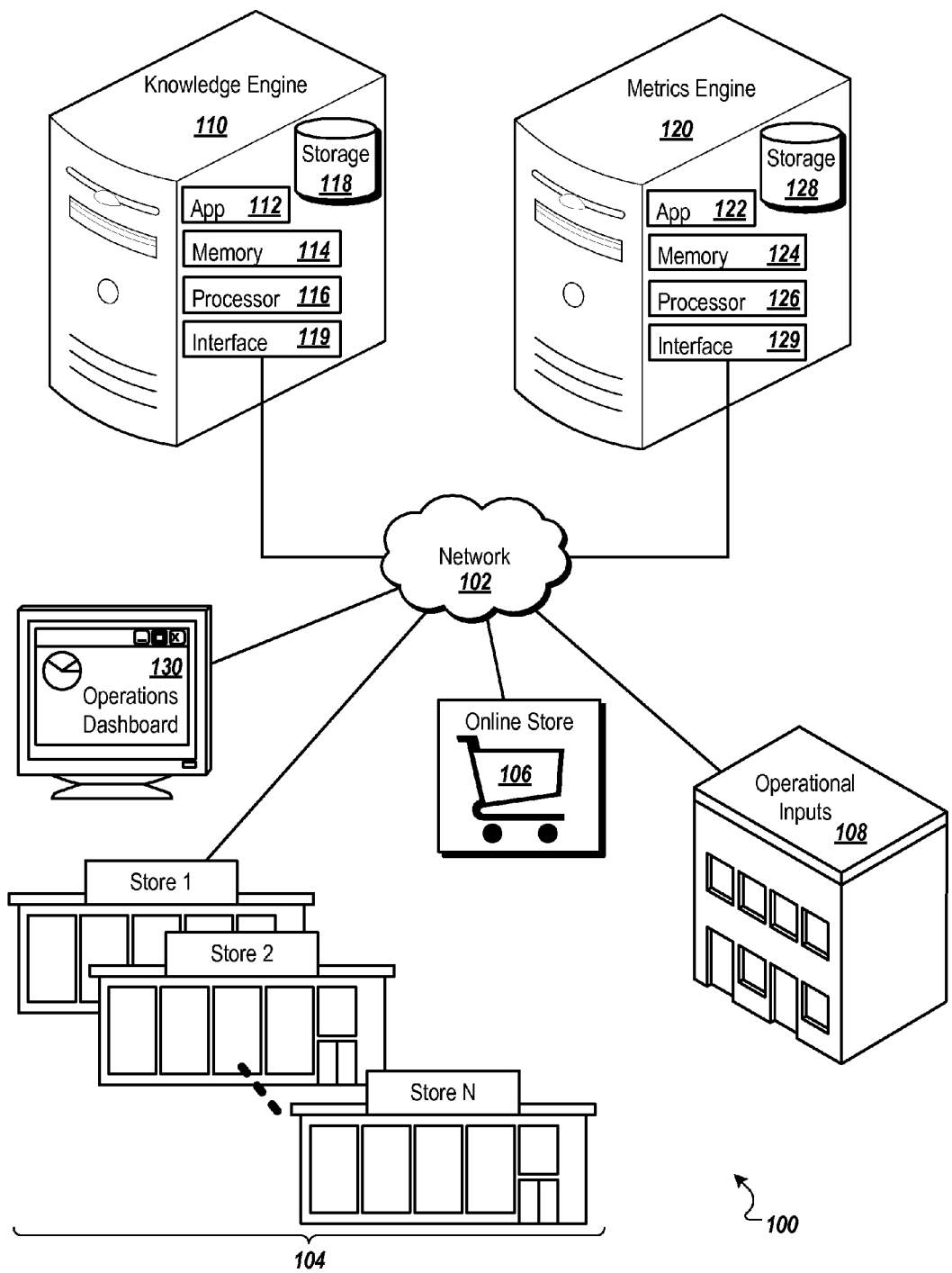
FIG. 1 shows a conceptual diagram of a representative operations system.

FIG. 1 shows a conceptual diagram of a representative operations system 100. In general, the system 100 can be used to collect, store, analyze, distribute, and otherwise manage information about the performance of one or more operational units, business units, or even entire businesses. For example, the operations system 100 may be used to track key performance indicators or KPIs for an operational unit of a business, such as a retail store. Users of the operations system 100 can access the information maintained in the system 100 to evaluate the performance of the business and to possibly determine various courses of action relating to the operation of the business.

The information maintained in the system 100 may be accessible to users in the form of an operations dashboard, which generally refers to an electronic graphical user interface on which real time and/or historical information may be gathered and collated from various sources in the business enterprise. For example, a business may have any number of databases that track and maintain current and historical operational information. Such databases may include legacy systems, relational databases, data warehouses, data management systems, and the like. Dashboards can provide users with a visual metaphor that can quickly convey information about the performance of an enterprise, similar to the way an automobile dashboard displays real time information about the performance of a vehicle.

Operations systems and dashboards can be useful to a variety of different users. For example, the CEO of a conglomerate company may use a dashboard to quickly and easily oversee the performance of various subsidiaries, and identify those subsidiaries displaying lagging performance in order to focus his or her limited time to addressing the challenges of those subsidiaries.

In another example, a regional manager of a chain of retail stores may use a dashboard to see the relative performance of all the stores in a particular region, and to quickly identify challenges that may be general to many of the stores or challenges that may be specific to individual stores. In some implementations, for example, the regional manager may use the dashboard to easily identify actions that have positively affected individual stores facing a particular challenge in the past, and replicate those actions to address similar challenges at other stores.

For example, customer satisfaction results may trend lower for a number of stores in the region, but the dashboard may help the manager notice that a single store in his region has managed to reverse the trend. The dashboard may provide an easy, visual way for the manger to drill down into the single store's data and discover that the store had recently increased the number of customer service personnel, or that the store had improved its training related to the customer service personnel. The manager may use this information to deduce that an increase in customer service personnel or an improvement in training can increase customer satisfaction. In turn, the manager may attempt to replicate the single store's successes by requesting that other stores also increase their number of customer service personnel or improve their training programs related to the customer service personnel.

An operations system 100 may include a network 102 that communicably connects a collection of operational units, such as any number of physical stores 104 and an online store 106, and/or a collection of operational inputs 108, to a knowledge engine 110 and a metrics engine 120. The network 102 can be implemented as one or more public or private networks, such as a local area network (LAN), a wide area network (WAN), or the like. For example, the network 102 can be a corporate LAN, the Internet, a cellular network, a modem-based dialup system, or other appropriate communications network.

The operations system 100 may receive operational data, such as gross sales, inventory quantities, and other information related to its business operations primarily from the business's operational units. In the example of a retail business, the company's various stores 104 may each be considered an individual operational unit. The operations system 100 may maintain and monitor various business performance metrics related to each of the stores, such as inventory, retail pricing, customer satisfaction, and the like. In some implementations, such data may be stored in databases at the stores 104 themselves, or may be stored in other offsite locations.

In addition to individual retail stores 104, a retail business may operate an online store 106, which may also be considered as one or more operational units, depending on how the organization is structured. The online store 106 can be a web-based storefront, service portal, subscription portal, reservations center, or other business that can be accessed electronically. Operations data, including one or more business performance metrics, related to the online store 106 can include some information similar to that gathered from the stores 104 (e.g., gross revenue, inventory, overhead expenses) as well as information that may be unique to online operations (e.g., page hit counts, abandoned sessions, electronic coupon utilization rates, etc.). In some implementations, the collection of operational units of a retail sales business can also include a number of wholesale outlets, order processing centers, warehouses, distribution centers, or other elements of a retail sales business.

The operations system 100 can also receive operations data from other sources, such as from other operational inputs 108. The other operational inputs 108 can include data that is gathered from customer feedback systems, research, consultants, expert opinion, financial inputs, competitor analyses, or other sources of business information that may not necessarily come directly from the operations associated with either the stores 104 or online store 106. Additional inputs can also come from other business units of the business enterprise.

For example, the operations system 100 can maintain and monitor various business performance metrics for distribution centers, wherein the operations system 100 can accept operational data such as order on-time fulfillment rates, cost-to-serve, fulfillment accuracy, and shipping volumes to monitor the operations of a product distribution center. By collecting data that may be specific to the operations of one or more distribution centers, the operations system 100 can record historical data which may be used to indicate the present performance of the distribution center or identify trends in the distribution center's past performance. For example, if on-time fulfillment rates and fulfillment accuracy scores are high but shipping volumes are low, then a distribution manager may be able to infer that the distribution center can reliably handle greater shipping volumes than it is currently handling.

Collected data may also be used to predict future distribution challenges. For example, historical data that shows that a distribution center's shipping volumes are rising while fulfillment accuracy rates for the same period have fallen may indicate that the distribution center is becoming overburdened. In some implementations, the two collections of data may be used to predict a maximum throughput that can be delivered while satisfying an acceptable accuracy rate, or to predict a date by which corrective measures should be taken to improve the historical trends and avoid problems that may arise from a confluence of these trends.

In another example, the operations system 100 may be configured to monitor the performance of a returned goods processing center. Data such as customer identities, product identities, and return reason codes may be used to identify problems. For example, if a large number of returns have been observed for a particular product for a common reason (e.g., air mattresses that leak, shirts with ripped seams, DVDs with scratches), then actions may be taken to resolve the issue such as requesting a remedy from the manufacturer or discontinuing future sales of the product and replacing it with an alternative equivalent product.

The metrics engine 120 can collect and store large quantities of data (e.g., in a database, a datacenter, a data warehouse, or the like). The metrics engine 120 can be a server, or other computer that can retain specific data (e.g., business metrics, including various retail performance metrics) collected from sources such as the collection of stores 104, the online store 106, the other operational inputs 108, and from other sources (e.g., human resources, marketing, R&D, or the like). The metrics engine 120 may include a metrics application module 122, such as a database server application, that can reside in a memory module 124 and can be executed by a processor module 126. The metrics engine 120 may store collected information in a storage module 128. In some implementations, the storage module 128 can be a hard disk, nonvolatile memory, a RAID array, or other data storage medium, or can be an external data storage medium such as a network share, a storage area network (SAN), or a network attached storage (NAS) unit. An interface module 129 may provide a physical and/or software bridge between the processor 116 and the network 102. For example, the interface 119 can be a network interface adapter.

The knowledge engine 110 may process and analyze operations data collected from the stores 104, the online store 106, the other operational inputs 108, and from other sources of information. The knowledge engine 110 may be used to help users identify trends, thresholds, and other indicators within the operational data. The knowledge engine 110 can be a server, or other computer that can analyze information stored by the metrics engine 120. The knowledge engine 110 may include a knowledge application module 112, such as a business operations application, an online analytical processing (OLAP), or other server application that can reside in a memory module 114 and be executed by a processor module 126. The knowledge engine 110 may store information, such as configuration data, queries, measures, dimensions, fact tables, or other information in a storage module 118. In some implementations, the storage module 118 can be a hard disk, nonvolatile memory, a RAID array, or other data storage medium, or can be an external data storage medium such as a network share, a SAN, or a NAS unit. An interface module 119 may provide a physical and/or software bridge between the processor 116 and the network 102. For example, the interface 119 can be a network interface adapter.

A user can access the collected operations data through an operations dashboard 130. The operations dashboard 130 may provide an intuitive user interface that can present information from the metrics engine 120 and the knowledge engine 110, through the network 102. In some implementations, the operations dashboard 130 can provide a combined graphical and textual display of current business performance parameters, historical information, trend data, and other business metrics that can be filtered, sorted, listed, graphed, or otherwise presented to the user. For example, the operations dashboard 130 can be configured to help the user quickly identify metrics, trends, or combinations thereof that can indicate challenges within the business (e.g., low inventory, declining sales, increases in customer complaints, or the like). Similarly, the operations dashboard 130 may be configured to help the user quickly identify operational information that demonstrates outstanding performance by one or more different business units.

In some implementations, the operations dashboard 130 can be a software application running on a computer or other electronic device (e.g., a cell phone, a personal digital assistant, or the like). The software application may be stored on a computer-readable storage medium that is accessible by the computer or other electronic device. The operations dashboard 130 can also be implemented via one or more web pages displayed to a user, for example, by a web browser. Examples of operations dashboard user interfaces are discussed below in relation to FIGS. 2 and 3.

The operations dashboard 130 may be used to present a user with possible solutions to diagnosed business challenges. For example the user may interact with the operations dashboard 130 to request the top ten challenges affecting the overall enterprise or a particular subset of operational units. The user's request may be communicated over the network 102 to the metrics engine 120. The metrics engine 120 can request and analyze the information in the knowledge engine 110 to determine a collection of challenge KPIs. The metrics engine 120 can then transmit the results to the operations dashboard 130 for presentation to the user.

The operations dashboard may also present the user with information that identifies and potentially resolves previously unknown challenges. For example, the metrics engine 120 may be configured to analyze trend information in the knowledge engine 130 to identify otherwise-undetectable challenges that may be developing, and upon detecting a developing challenge, the metrics engine 120 may analyze the trend and formulate one or more suggestions to a user for proactively addressing the challenge. The operations dashboard 130 may display the identified potential challenges as well as the suggested solutions so the user can be alerted to the situation and select one or more corrective courses of action.

In response to the system's display of certain challenges, as described above, the user may wish to obtain assistance for selecting a corrective action to resolve one or more challenge KPIs. In some implementations, the metrics engine 120 can interact with the knowledge engine 110 to suggest one or more possible solutions to one or more challenges within the business. For example, the knowledge engine 110 can store historical data, and the metrics engine 120 may search the historical data to find similar challenges that may have happened in the past. The metrics engine 120 can analyze these historical scenarios, the actions that may have followed in response, and the outcomes of those actions to determine which ones may have proven to be the most effective. The metrics engine 120 may provide descriptions of those past actions to the user, via the operations dashboard 130, for consideration as possible solutions to the current challenge.

The metrics engine 120 may also include an expert system application. For example, the expert system may be trained with a set of rules to identify potential solutions to various scenarios. In various implementations, the metrics engine 120 may include a rules based, logic based, induction based, constraints based, hierarchical based, or other type of expert system or combinations thereof. For example, in a rules based system, the user may wish to know how to improve the lagging sales of men's pants. The expert system may be trained with a set of rules, such as "if sales of a non-closeout product are low, then reduce the price of the product," "if a clothing item is advertised, then sales of the item generally increase by approximately 10%," or "if the price of any normally stocked item is reduced by more than 10%, advertise the product." By using these and other rules, the expert system may suggest that the price of men's pants should be reduced, that men's pants should be advertised more, or some combination of both of these actions. The suggested solutions may also be accompanied by recommendation scores (e.g., a number that indicates the expert system's confidence in the efficacy of each solution) that can be ranked to determine a collection of one or more likely solutions to a given scenario.

In some implementations, the expert system may interact with the user (e.g., through the operations dashboard 130) and the knowledge engine 110 to obtain additional information that may be used to determine and refine the collection of challenges and suggested solutions. Continuing with the previous example of men's pants, the expert system may query the knowledge engine to determine if there is a trend that indicates that certain brands, colors, sizes, etc., are of particular concern, and suggest more focused solutions (e.g., discount only Acme brand dress pants, advertise only black denim jeans, and/or discount all big and tall pants sizes).

In one example of the use of an operations dashboard to address potential challenges in a retail store, a particular store may exhibit a certain set of symptoms (e.g., slight decreasing trends in sales that appear to be increasing downward, and additional complaints received in the previous two months). These symptoms may be indicative of a challenge, such as an inventory level below acceptable levels. When the system sees these symptoms developing, it may proactively consult a knowledge database of various store issues to see if the symptoms fit with any of the root causes that have been identified for those particular symptoms. For example, a root cause of declining inventory levels may be that the store is not staffing the appropriate number of stock-room associates. If such a root cause is indicated, a few potential fixes may be recommended to the user through the operations dashboard. In the example, one potential fix may be to recommend hiring additional stock-room associates, while another potential fix may be to implement additional training programs to improve the efficiency of those associates.

In another example, a particular store's revenue may have declined for three straight months year-over-year, which may indicate a challenge facing that particular store. If these declines are combined with an increasing number of high-value thefts at the store, the recommended fixes may be to improve the security associated with the high-value items, increase surveillance in particular areas, or increase store personnel in those areas. Based on the relative decreases of theft-based losses for any of those solutions, and the costs necessary to implement those solutions, a ranked list of solutions may be recommended to the dashboard user.

In yet another example, an operations dashboard can be adapted to address the challenges of operating a product distribution network. A distribution center's fulfillment rates may have declined over the previous year, which may indicate that the center may be having trouble distributing goods in an efficient manner. By combining the fulfillment rate information with information regarding distribution volumes, a better understanding of the problem and possible solutions may be obtained. For example, if declining fulfillment rates are coincident with steady or declining distribution volumes, then the data may indicate to a distribution manager that the distribution center's performance could be improved through better use of the existing facility (e.g., reorganizing the warehouse layout, additional employee training, improved ergonomics). However, if decreasing fulfillment rates are coincident with increasing distribution volumes, then the data may indicate that the facility itself has become a bottleneck within the distribution system. In this scenario, the combined data may indicate to the distribution manager that the distribution center is reaching its maximum distribution volumes, and that possible solutions may include an expansion of the distribution center or a reallocation of distribution volumes to other less-stressed centers. By observing the historical trends of fulfillment and volume, it may also be possible for the operations system 100 to make a prediction as to a date in the future when the scenario may become further complicated (e.g., the date when the center may no longer be able to fulfill orders as needed). By determining this projected date, the distribution manager can be provided with not only a possible solution to an identified problem, but also a recommended date by which the solution may be proactively implemented to avoid additional complications.

While several users of the business operations system 100 have been described previously, other users may exist. For example, the operations dashboard 130 may be configured as a knowledge base user interface that provides users with connections to the content of the knowledge engine 110 for various purposes, such as for retrieving and following up an action items as assigned on the operations dashboard 130. Users of such a knowledge base user interface may include field users, who may enter feedback and results on recommended actions, or headquarters users who may modify business rules and adjust confidence levels to cause a particular action to be followed in specific situations, or other users who may collaborate and interact with feedback and action plan information communicated through the operations dashboard 130.

In some implementations, the operations system 100 or parts thereof may be implemented using cloud computing, in which the knowledge engine 110, the metrics engine 120, or other elements of the operations system 100 can be implemented as a collection of dynamically scaled and often virtualized resources, possibly hosted by an external computing provider. By implementing various aspects of the operations system 100 using cloud computing, the business enterprise can avoid the capital expenditure and overhead of maintaining a physical computing infrastructure by purchasing computing bandwidth on a consumption or subscription basis.

Figure 2:
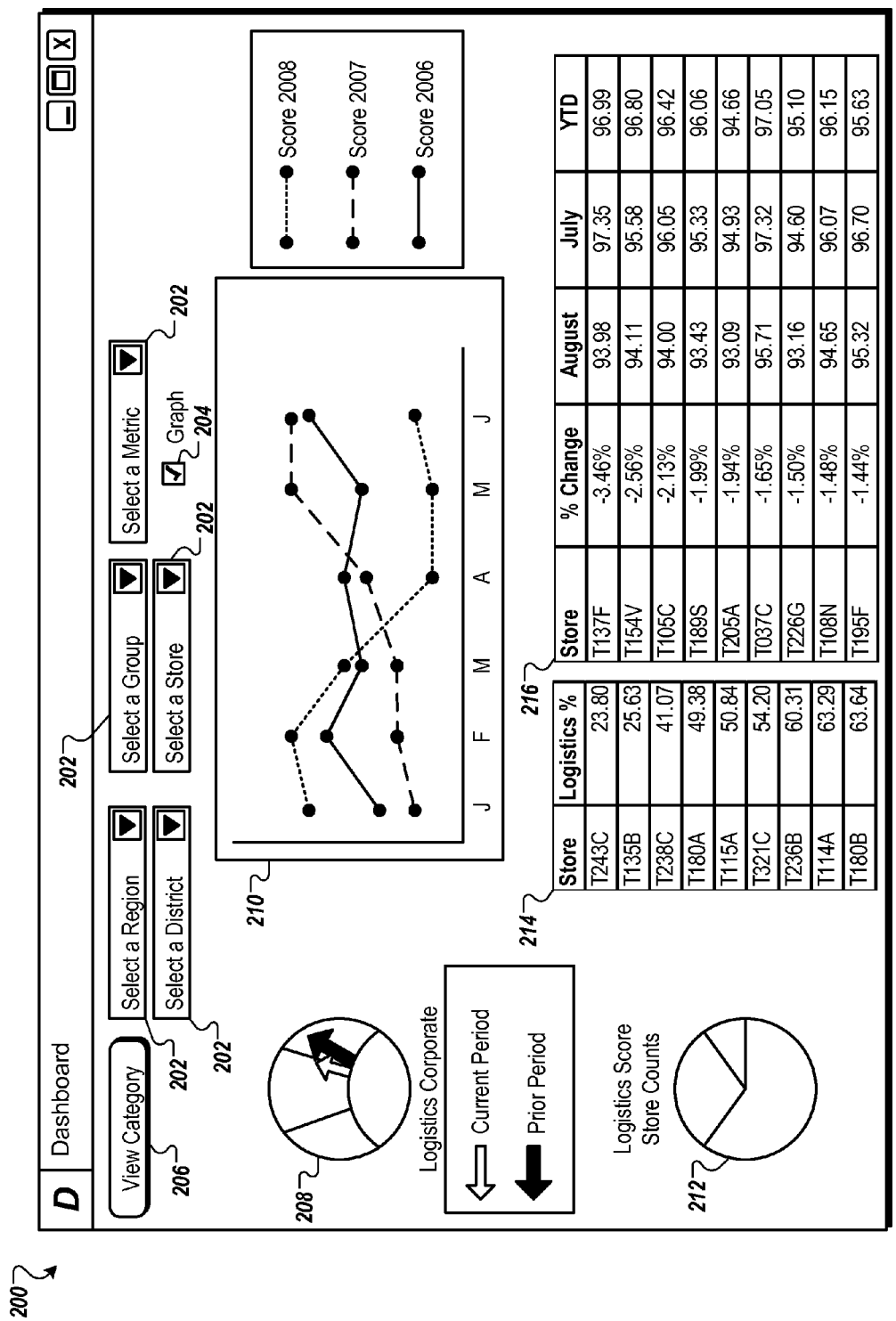
FIG. 2 shows an example of a representative operations dashboard user interface.

FIG. 2 shows an example of a representative operations dashboard user interface 200. In some implementations, the user interface 200 may be the operations dashboard 130 of FIG. 1. The user interface 200 may be configured to include various tables, charts, graphs, indicators, meters, buttons, selectors, and other elements that a user can view and use to select, filter, sort, and otherwise interact with business operations data.

For example, the user interface 200 may include a collection of dropdown selectors 202. The dropdown selectors 202 can be used to select business operations data for one or more regions, districts, groups, stores, or specific business metrics. For example, the user may use the dropdown selectors 202 to request inventory outages at wholesale outlets in Canada. In another example, the user may use the dropdown selectors 202 to request gross revenue data for retail stores in a northern U.S. region (e.g., Minnesota, Iowa, North Dakota, South Dakota, and Wisconsin).

The user may select a graph checkbox 204 to request that the selected data be graphed or otherwise graphically displayed when the data is presented. When the user has made the desired selections, a view category button 206 can be clicked to request the selected data (e.g., from the metrics engine 120). Upon clicking the view category button 206, the data presented on the operations dashboard may be updated to reflect the user's selection of parameters.

The user interface 200 can variously display requested business information using various graphical indicators, such as a gauge 208, a trend chart 210, a pie chart 212, and/or one or more tables 214 and 216. In the illustrated example, the gauge 208 can show, for example, one or more KPIs for one or more periods, such as the current period and the prior period. The trend chart 210 may display trend or other data for one or more periods. In the illustrated example, the trend chart 210 can be configured to graphically display a KPI for the first six moths of three consecutive years. In this way, the user may be able to compare the relative performance of one or more KPIs over a similar time period in multiple years.

The pie chart 212 indicator may be configured to display the relative components of a KPI. For example, the pie chart 212 may show the relative contributors to company revenue (e.g., 60% from retail sales, 30% from wholesale sales, and 10% from government sales). In another example, the pie chart 212 may show the relative contributions of various store departments (e.g., clothing, electronics, office supplies, health and beauty) to a store's total revenue.

The tables 214 and 216 may be configured to display a collection of stores and their respective performance data. In the illustrated example, the table 214 may be sorted display a list of the stores with the lowest scores for a chosen KPI. The table 216 may be configured to display an ordered list of the top or bottom performing stores for a chosen KPI (e.g., % change), along with additional information such as scores for individual months, and year-to-date scores. In some implementations, the user may be able to sort the information displayed in the tables by clicking on a header item. For example, a user may click on the column labeled "August" in the table 216 to sort the table's entries by their scores for August, ranked from highest to lowest. In another example, the user may be able to click the "August" header again to reverse the sort order (e.g., ranking from lowest to highest).

In various examples, the user interface 200 can be configured for specific categories of users. For example, a version of the user interface 200 can be configured for use by a store manager, wherein the user interface 200 can be configured to provide the store manager with quick access to data such as sales quotas on a storewide or departmental basis, staffing levels, customer response to local advertising, and other data that may be used to manage a store. In another example, the user interface 200 can be configured for use by a team member (e.g., a floor salesperson), wherein the user interface 200 can be configured to display inventory levels on the sales floor, in the back inventory, at other stores, or at the warehouse. By providing easy access to such data, team members may be able to better satisfy their customers' needs.

Other configurations of the user interface 200 can be designed for use by financial managers. For example, a financial manager's configuration of the user interface 200 may include visual elements such as maps that denote various sales regions and charts that can display and compare data between regions. The financial manager may also be provided with visual elements that provide historical and/or projected financial data for an individual region or for the entire business enterprise. By having ready access to such information, the financial manager can make better informed decisions regarding planned expansions, investments, acquisitions, divestitures, dividends, and other financial aspects of a business enterprise.

In some implementations, operations dashboards can be used by users who are external to the business enterprise. For example, the user interface 200 can be configured for use by a vendor. The vendor may be given access to historical and/or predictive data regarding the products that the vendor supplies to the business enterprise. By having access to this data, the vendor may be able to better anticipate product demand and adjust production rates as needed. In another example, the user interface 200 can be configured for use by customers. The customers can be provided with a dashboard that shows the top five toys of the year, the top ten movies of the week, and other such dynamic information. Customers can be provided with interface elements that let them easily click through to obtain additional product description information as well as pricing and availability.

Figure 3:
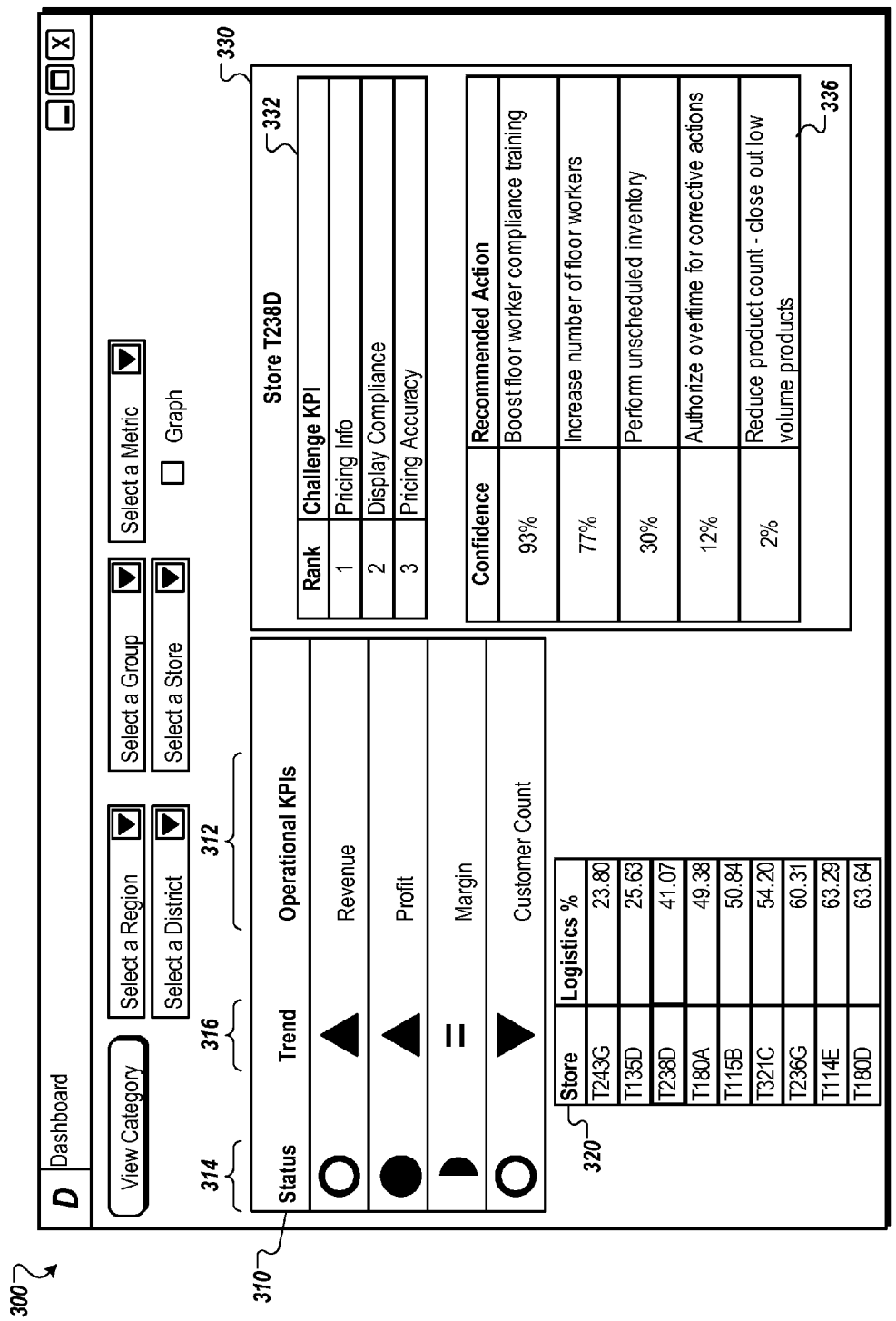
FIG. 3 shows an example of a representative operations dashboard user interface for identifying challenge indicators and possible corrective actions.

FIG. 3 shows an example of a representative operations dashboard user interface 300 for identifying challenge KPIs and possible corrective actions. In some implementations, the user interface 300 may be an alternative view or configuration of the user interface 200 of FIG. 2. As shown, the user interface 300 may include a status and trend indicator 310, a table 320, and a diagnostic interface 330.

The status and trend indicator 310 can display a number of operational KPIs 312, such as "revenue," "profit," "margin," and "customer count" in the illustrated example. The status and trend indicator 310 can also display a number of status indicators 314 and trend indicators 316 (e.g., one status indicator and one trend indicator for each displayed operational KPIs 312). In some examples, the status and trend indicators 314 and 316 can provide the user with simple status information scorecards that can help the user quickly understand the current status of a number of the operational KPIs 312.

In some implementations, scorecards can present the user with one or more items of information that can be associated with a simple indication of data associated with the item or items. In an example of a store management scorecard, a store manager may be presented with a list of departments within the store, and each listed item may be accompanied by a symbol (e.g., up/down arrows, thumbs up/down, smiley/sad face, an A-F letter grade) to indicate each department's performance. In other implementations, scorecard items may be accompanied by indicators such as a color code (e.g., semaphore), a word or short phrase (e.g., "PASS"/"FAIL", "ONLINE"/"OFFLINE"), or a number (e.g., a percentage, a dollar amount) to quickly convey the status of the items listed. In some implementations, the status information scorecard can be a static report displaying historical data over a given time period. For example, the scorecard may have multiple data layers, and may represent a high level overview of multiple metrics. The status indicators 314 may be symbols that can be easily understood and quickly convey that each of the operational KPIs 312 has a status that is considered to be "good," "bad," or "neutral" for example. In other implementations, more than three different status levels may be conveyed by the use of respective symbols.

Similarly, the trend indicators 316 may be symbols that can show the user that each of the operational KPIs 312 is trending upward, downward, or has shown negligible change. It should be understood that the aforementioned examples of symbols and meanings are not limited to the examples given. For example, the status and trend indicators 314 and 316 may include other symbols that represent additional meanings. In another example, the status and trend indicators 314 and 316 may be color coded or animated to indicate such things as severity, rate, recent changes, or other similar meanings.

The table 320 can include a list of items, such as a list of stores and logistics percentages. In the illustrated example, the information displayed in the table 320 may be ordered to show a number of lowest ranking stores for a selected operational KPI. As identified by their presence in the list, each of the stores may be experiencing some operational difficulties related to the selected KPI. A portion of the table may be clickable, such that the user may be able to click on an item in the table 320 to request additional information. For example, the user may wish to see additional information about the store labeled "T238D," perhaps to diagnose and possibly address the cause of the store's low KPI score. The user may click on the row that includes the store "T238D," and the user interface 300 may respond by requesting additional information (e.g., from the metrics engine 120 of FIG. 1) to populate a diagnostic interface 330.

The diagnostic interface 330 may be configured to display information so the user can easily identify challenge KPIs and possible solutions. In certain implementations, the diagnostic interface can include a challenge KPI table 332 and a recommended solution table 336. In the illustrated example, the diagnostic interface 330 displays challenge and solution information for a specific store "T238D." The challenge KPI table 332 can display one or more top ranked issues for the selected store. In some implementations, the challenge KPI table 332 may be populated by information received from the metrics server 120, such as information determined at the time of the request, information determined in advance by the metrics server 120, or a combination of both.

Whether a certain KPI is a challenge KPI for the purposes of the diagnostic interface 330 may be determined in a number of different ways. For example, a KPI for a given store may be identified as a challenge if the KPI is above or below a certain threshold value, outside a determined range of acceptable values, or if the KPI is a certain percentage below the average KPI for similarly situated stores, or if the KPI has shown bad trending data for a period of two or more months in a row, etc. In some implementations, the thresholds and ranges may be based on or calculated from one or more KPI values. For example, statistical analysis can be used to determine a mean KPI value for the stores 104 of FIG. 1, and the acceptable KPI range may be set within one standard deviation above and below the mean KPI. In this example, the statistically determined range may help identify stores with KPIs that are statistical outliers, which may indicate one or more challenges to be addressed. Furthermore, as the values of the KPIs change (e.g., over time, in response to corrective action, etc.), the thresholds and acceptable ranges can dynamically change as well. Regardless of how the challenge KPIs are identified, they may be presented to the user in a ranked format, as shown in table 332.

In some implementations, the metrics engine 120 may determine one or more recommended actions that may address one or more of the challenge KPIs for the selected store. For example, the metrics engine 120 can include an expert system that can analyze one or more challenge KPIs, and use a collection of rules and historical data to determine one or more actions that may improve the scores of identified challenge KPIs. In another example, the knowledge engine 110 may use other techniques, as described herein, to identify potential solutions that may improve the challenge KPI.

The recommended solution table 336 can display a collection of recommended actions as well as a confidence score for each recommendation. The set of actions may be displayed in a ranked order in the recommended solution table 336. For example, the actions may be ranked by the confidence score for the particular recommendation. Alternatively, the actions may be ranked by the projected cost of implementing the particular recommendation, and may be sorted from the lowest cost to the highest cost. The ranking may also be some combination of these factors. For example, the set of actions may be ranked by a weighted score, such as a weighted average score, that includes consideration of both a confidence score and a cost-based score.

The metrics engine 120 may determine a number of actions that may address a collection of challenge KPIs, wherein each action may have a different probability of accuracy or effectiveness. For example, the metrics engine 120 may determine that the challenge KPIs in the illustrated example may be substantially related to employee training (e.g., the employees may need to be refreshed on store procedures regarding the placement of price tags and other displays on or around product shelves). The metrics engine 120 may then recommend that "Boost floor worker compliance training" as an action that has an estimated 93% chance of success, and display that recommended action and others using the recommended solution table 336.

In some examples, the user may be able to click on a row in the challenge KPI table 332 to request a list of recommended corrective actions for a single challenge KPI. For example, the user may click on the row labeled "Pricing Accuracy," and the user interface 300 may respond by displaying recommended actions to resolve "pricing accuracy" challenges in the recommended actions table 336. Such recommended actions could include such things as "audit pricing database" and/or "inspect shelves for outdated pricing labels," among other examples.

In some implementations, the user interfaces 200 and 300 can be dedicated (e.g., thickware) applications, while in other implementations, the user interfaces 200 and 300 can be "thin" applications that provide access to computing processes running on a remote computer. For example, the user interfaces 200 and 300 can be deployed as web pages or terminal applications wherein the user interface is presented on the user's device while a backend server performs some or all of the computing tasks.

While many of the previous examples have described the user interfaces 200 and 300 as being configured for use on personal computers, in other implementations the user interfaces 200 and 300 can be adapted for use on other types of computing devices. For example, the user interfaces 200 and 300 may be configured for use on a mobile device platform (e.g., cell phone, smart phone, personal digital assistant), wherein the user interfaces 200 and 300 be adapted to accommodate the mobile devices' differences (e.g., smaller screens, reduced memory) or to take better advantage of the mobile devices' capabilities (e.g., touch screens, audio input/output). The mobile user may be able to define data groups that consolidate and transmit selected data as needed, or on a preferred schedule. In some implementations, the mobile device platform may include a subset of features that are available on other platforms, such as a personal computer. Other digital media platforms may also be used to distribute data, actions, and feedback, and integrate with the knowledge engine 110. For example, a business enterprise may collaborate with various media providers to integrate implementations of the user interfaces 200 and 300 on GPS navigation devices, wherein a business consultant may be able to travel from region to region, or store to store, and receive not only information that helps find the destination, but receive location-based operational data as well. Media players and video game consoles may also be enhanced with implementations of the user interfaces 200 and 300. For example, a user may be able to hear a song clip or play a game demo, and then be presented with a user interface which indicates the inventory levels at various retail locations where the corresponding CD or game can be purchased.

Figure 4:
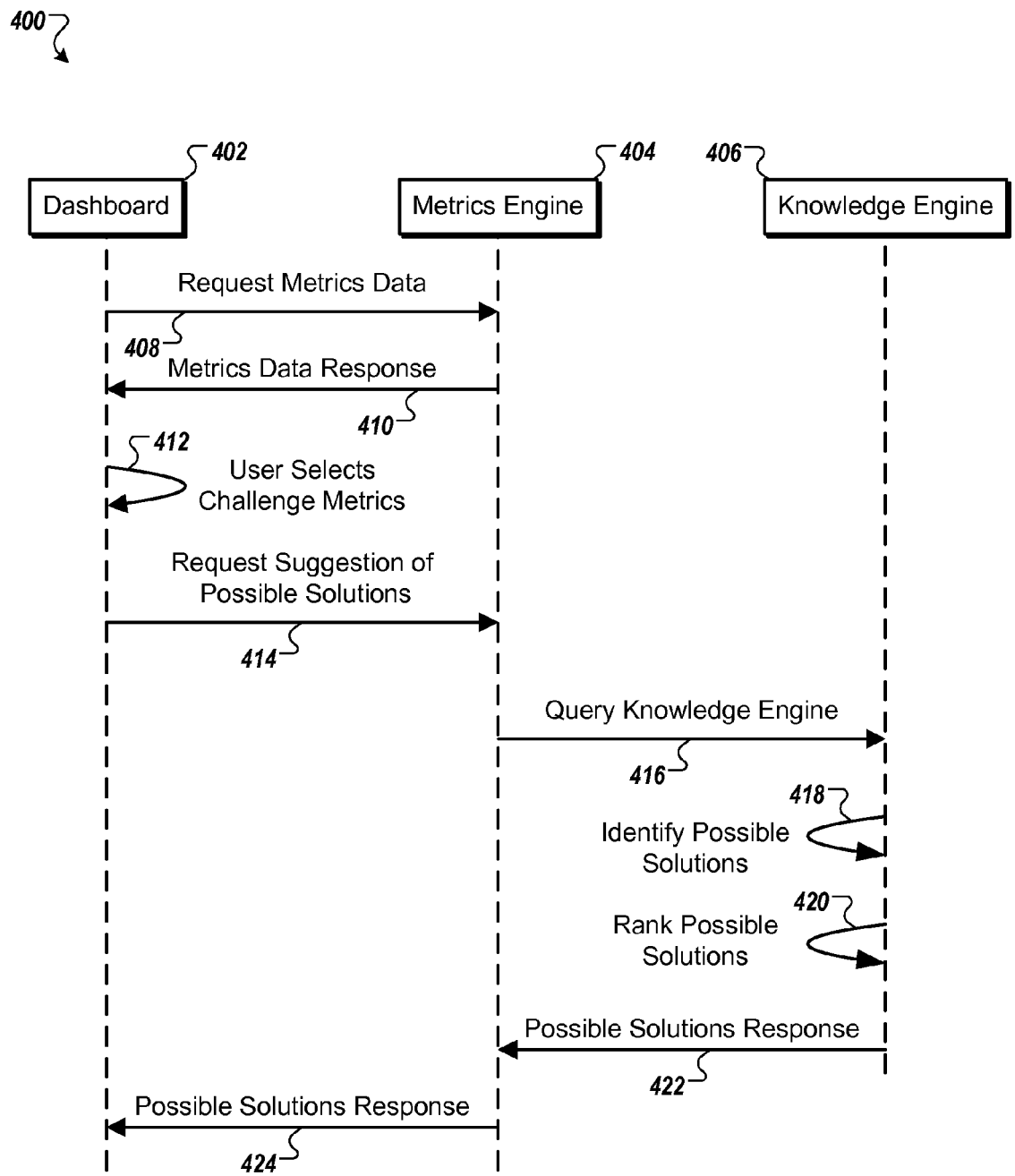
FIG. 4 shows a swim lane diagram of representative interactions among elements of an operations system.

FIG. 4 shows a swim lane diagram 400 of representative interactions among elements of an operations system, such as the operations system 100 of FIG. 1. A dashboard 402 can include or incorporate the operations dashboard 130, and can request 408 metrics data from a metrics engine 404 (e.g., in response to the user interacting with user interface elements provided by the dashboard 402). In some embodiments, the metrics engine 404 may be the metrics engine 120 of FIG. 1.

The metrics engine 404 may respond 410 to the request 408 with a collection of metrics data, such as operational KPI data, historical data, trend data, and other information. The response 410 can include a collection of one or more identified challenge metrics. For example, the metrics engine 404 may be configured to rank KPIs according to importance or severity, or to detect trends in KPIs that may indicate a future issue. The metrics engine 404 can respond 410 by communicating the ranked or otherwise detected challenge KPIs for display by the dashboard 402, in a user interface element such as the challenge KPI table 332 of FIG. 3.

The user can inspect the list of metrics and select 412 one or more challenge metrics. The user can then click on or otherwise identify the one or more challenge metrics and cause the dashboard 402 to request 414 a suggestion of possible solutions from the metrics engine 404. In response, the metrics engine 404 may query 416 a knowledge engine 406, such as the knowledge engine 110 of FIG. 1. Alternatively, the metrics engine 404 itself may determine a list of possible solutions or determine that no such solutions exist.

Upon receipt of the query 416, the knowledge engine 406 may identify 418 one or more possible solutions. For example, the knowledge engine 406 may include an expert system that can process the challenge metrics against a set of rules, statistics, historical data, user input, other KPIs, and other information to determine one or more possible solutions to the selected 412 challenges.

In some implementations, each of the possible solutions identified 418 by the knowledge engine 406 may be associated with a confidence value. For example, the confidence values may indicate how likely the identified 418 solution may be to address the selected 412 challenge metrics, or how effective the identified 418 solutions may be if implemented. The knowledge engine 406 may rank 418 the possible solutions to determine those solutions that may be most effective for solving the selected 412 challenge metrics. The knowledge engine 406 may then respond 422 with the collection of possible solutions by communicating the collection to the metrics engine 404. Alternatively, the knowledge engine 406 may respond directly to the dashboard 402 without passing the response through the metrics engine 404.

The metrics engine 404 may perform additional filtering, sorting, and caching of the identified 418 possible solutions, and may answer the request 414 by responding 424 with the list of possible solutions. The dashboard 402 may receive the response 424, and may display the possible solutions in a user interface, such as the recommended solution table 336.

Figure 5:
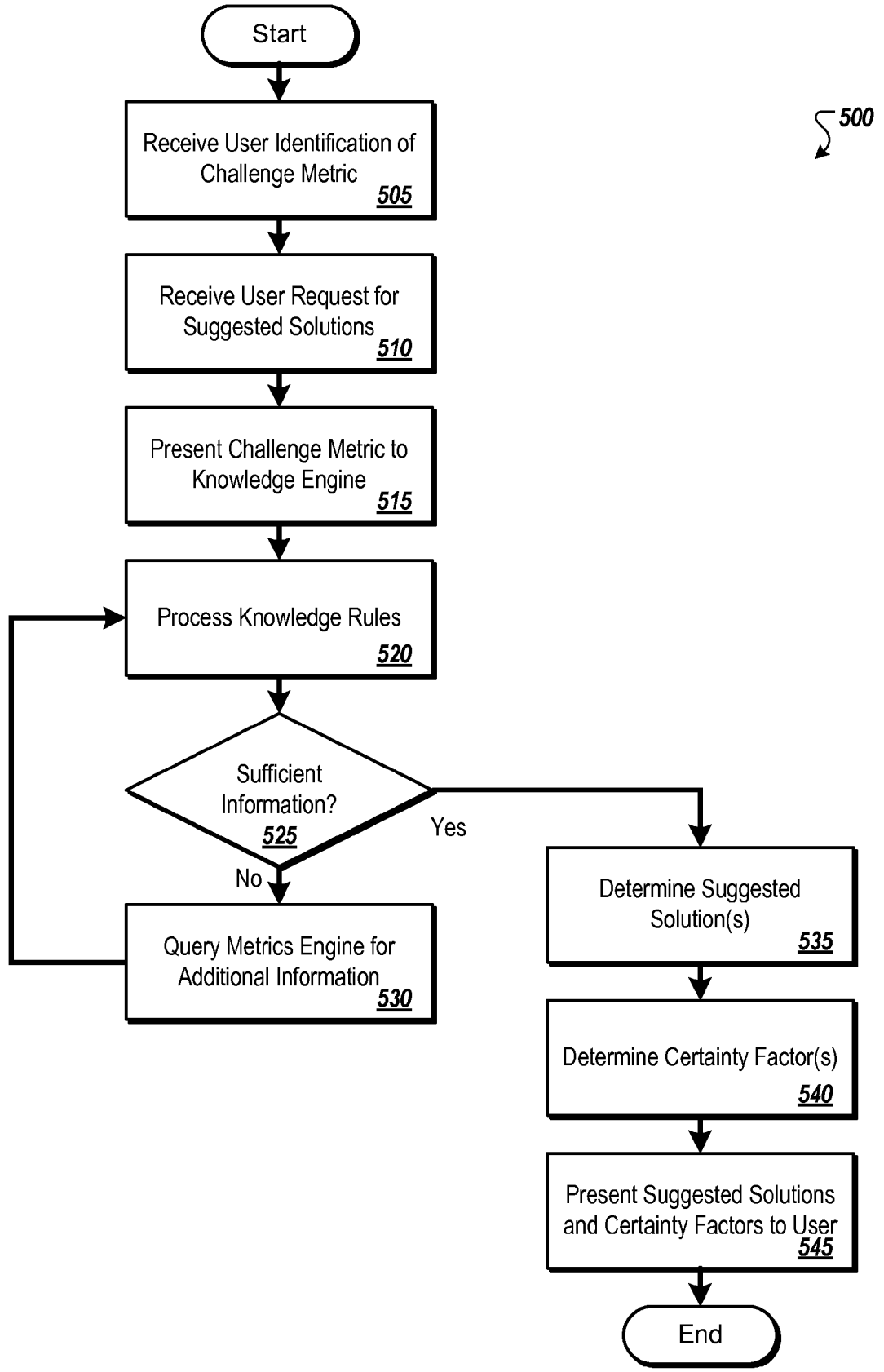
FIG. 5 shows a flow diagram of a representative process for identifying challenges and suggesting possible solutions in an operations system.

FIG. 5 shows a flow diagram of a representative process 500 for identifying challenges and suggesting possible solutions in an operations system, such as the operations system 100 illustrated in FIG. 1. At step 505, a user identification of a challenge metric can be received. In some embodiments, this may involve one or more user inputs to a user interface such as the operations dashboard 130 to identify one or more challenge metrics.

At step 510, a user request for suggested solutions may be received. For example, the user may click a button in the operations dashboard 130 or otherwise indicate that he or she wishes to receive suggestions to the previously identified challenge metrics. The selected challenge metric or metrics can be presented to a knowledge engine (e.g., the knowledge engine 110) at step 515.

At step 520, the knowledge engine may processes knowledge rules. Such knowledge rules can include expert system inference rules, historical data, statistical data, trend data, pattern recognition data, user input, and other rules and information. If at step 525, it is determined that more information is needed in order to suggest one or more solutions, then the process may return to an earlier step such as step 520 to process additional rules. In some examples, additional information may be obtained by querying current and historical KPI data from the metrics engine at step 530. Alternatively the additional information may be obtained by directly querying the user. If at step 525 it is determined that sufficient information is available, then the process 500 may continue at step 535.

At step 535, one or more suggested solutions may be determined, and the certainty factors (e.g., recommendation confidence scores) may be determined at step 540. Then at step 545, the suggested solutions and certainty factors may be presented to the user. For example, the suggested solutions may be displayed in a user interface such as the recommended solution table 336.

Although exemplary embodiments have been described with reference to the figures, other implementations are possible. For example, the operations system can be used to identify other types of challenges or opportunities for improvement. One such example could be market basket analysis, which is a technique used to determine items that are frequently sold together, and by detecting these patterns, store managers may be advised to place items that are often purchased together in strategic locations across the store to promote the sales of these items. Another example may be campaign management, wherein the historical responses of various individuals and demographic groups can be analyzed to cost-effectively target marketing campaigns. In some implementations, the operations system 100 can include other types of statistical, historical, and artificial intelligence algorithms to analyze collected data. Some examples of these algorithms may include regression techniques, neural networks, decision trees, clustering, segmentation, association rules, sequence association, nearest neighbor, fuzzy logic, genetic algorithms, etc.

Figure 6:
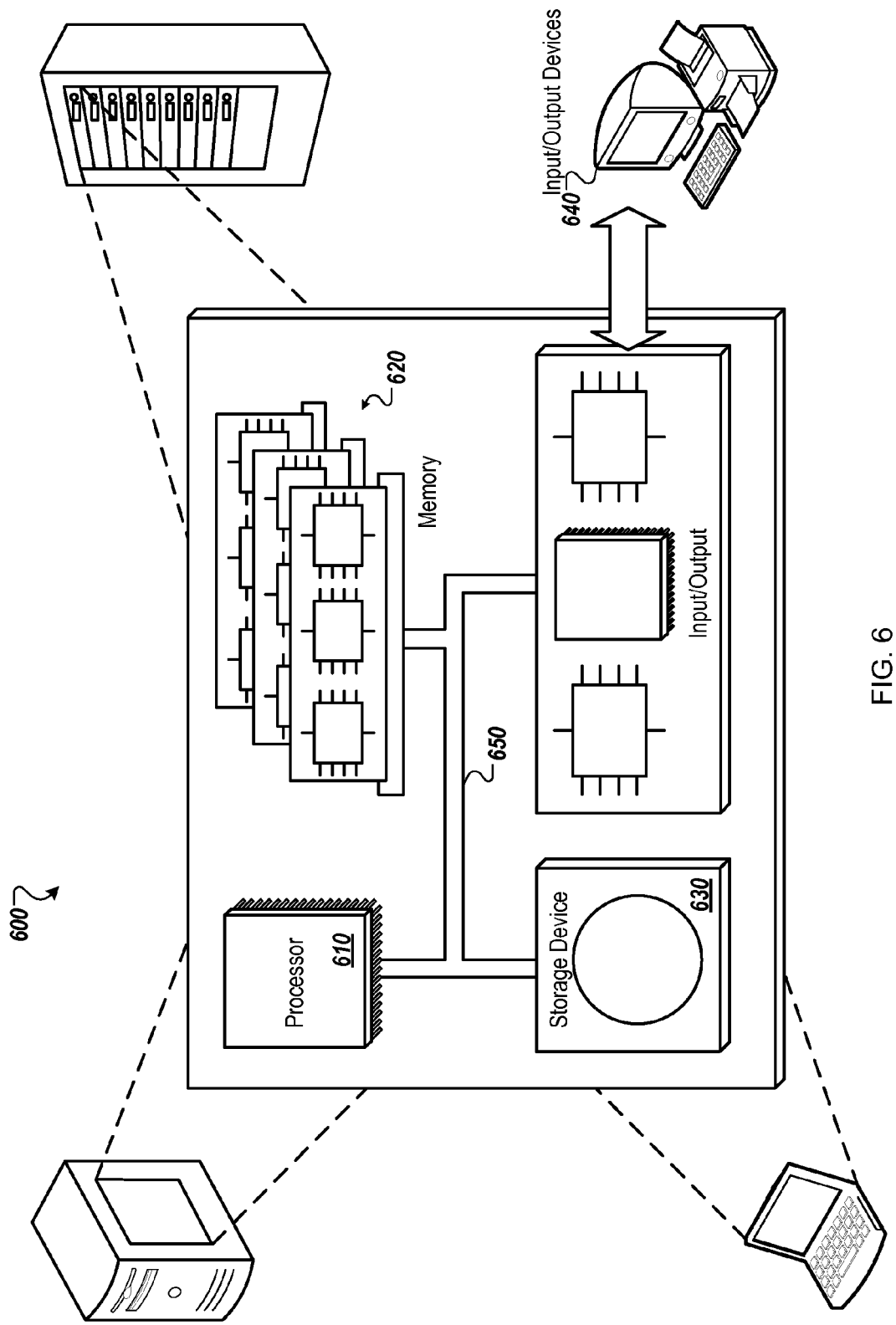
FIG. 6 is a schematic diagram of a representative computer system.

FIG. 6 is a schematic diagram of an example of a generic computer system 600. The system 600 can be used for the operations described in association with the process 500 according to one implementation. For example, the system 600 may be included in either or all of the knowledge engine 110, the metrics engine 120, the operational dashboard 130, and computers and servers that may be part of the stores 104, the online store 106, and operational inputs 108.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer-implemented method for presenting a recommended solution to a selected business challenge within a retail business enterprise via an operations dashboard configured to display one or more business performance metrics related to one or more operational units of the retail business enterprise, the method comprising:
    identifying, with a computer, a set of one or more operational units of a retail business, each operational unit in the set having at least one business challenge relating to one or more business performance metrics, as diagnosed by a metrics engine that collects and stores data and maintains business performance metrics including retail performance metrics associated with the set of one or more operational units;
    displaying the set of one or more operational units having at least one business challenge on an operations dashboard;
    receiving user input to the operations dashboard, said user input including a selection of one of the set of one or more operational units displayed on the operations dashboard;
    in response to the user input selecting one of the set of one or more operational units displayed on the operations dashboard, querying the metrics engine to analyze trend information contained in a knowledge engine having a knowledge application module that processes and analyzes operations data to help a user identify a trend to obtain at least one new business challenge of the selected operational unit based on the trend information;
    displaying the at least one new business challenge of the selected operational unit in a first table on the operations dashboard and displaying an identifier for the selected operational unit;
    receiving user input to the operations dashboard selecting the at least one new business challenge of the selected operational unit;
    in response to the user input selecting the at least one new business challenge of the selected operational unit, querying the knowledge engine by the metrics engine to obtain one or more solutions to the selected at least one new business challenge of the selected operational unit; and
    displaying, in a second table, the one or more solutions determined by the metrics engine in response to the knowledge engine query on the operations dashboard.

2. The method of claim 1, wherein the one or more solutions to the selected at least one new business challenge of the selected operational unit each have a corresponding recommendation score that relates to an expected efficacy of the one or more solutions.

3. The method of claim 2, wherein the corresponding recommendation score is calculated based on a projected likelihood of the one or more solutions to solve the selected at least one new business challenge.

4. The method of claim 2, wherein the corresponding recommendation score is calculated based on a projected cost to implement the one or more solutions.

5. The method of claim 2, wherein the corresponding recommendation score is calculated based on a likelihood of the one or more solutions to solve the selected at least one new business challenge and a projected cost to implement a solution.

6. The method of claim 5, wherein the corresponding recommendation score is calculated as a weighted average of the likelihood of the one or more solutions to solve the selected at least one new business challenge and a projected cost to implement the one or more solutions.

7. The method of claim 1, wherein a business challenge for an operational unit is diagnosed by the metrics engine when a value of a business performance metric of the operational unit is outside a determined range of values.

8. The method of claim 7, wherein the determined range of values is determined based on a business performance metric of one or more other operational units of the retail business enterprise.

9. A computer program product including a non-transitory machine-readable storage device including instructions that, when executed, perform steps for presenting a recommended solution to a business challenge at a retail store via an operations dashboard configured to display one or more retail performance metrics related to one or more stores of a retail business enterprise, the steps for presenting a recommended solution comprising:
    identifying, with a computer, a set of one or more stores of a retail business, each store in the set having at least one business challenge relating to one or more retail performance metrics, as diagnosed by a metrics engine that maintains retail performance metrics associated with the set of one or more stores;

displaying a list of the set of one or more stores having at least one business challenge on an operations dashboard;

receiving user input to the operations dashboard selecting, from the list, a store of one of the displayed set of one or more stores;

in response to the user input selecting, from the list, a store of the displayed set of one or more stores, querying the metrics engine to obtain at least one business challenge of the selected store, wherein the metrics engine analyzes trend information contained in a knowledge engine that processes and analyzes operations data collected from the set of one or more stores to identify a business challenge of the selected store;

displaying at least one business challenge of the selected store in a first table on the operations dashboard and displaying an identifier for the selected store;

receiving user input to the operations dashboard selecting the at least one business challenge of the selected store;

in response to the user input selecting the at least one business challenge of the selected store, querying the knowledge engine by the metrics engine to obtain one or more solutions to the selected at least one business challenge of the selected store; and displaying the one or more solutions obtained by the metrics engine from the knowledge engine query in a second table on the operations dashboard.

10. The computer program product of claim 9, wherein the one or more solutions to the selected at least one business challenge of the selected store each have a corresponding recommendation score that relates to an expected efficacy of the one or more solutions.

11. The computer program product of claim 10, wherein the corresponding recommendation score is calculated based on a projected likelihood of a solution to solve the selected at least one business challenge.

12. The computer program product of claim 10, wherein the corresponding recommendation score is calculated based on a projected cost to implement a solution.

13. The computer program product of claim 10, wherein the corresponding recommendation score is calculated based on a likelihood of a solution to solve the selected at least one business challenge and a projected cost to implement the solution.

14. The computer program product of claim 13, wherein the corresponding recommendation score is calculated as a weighted average of a likelihood of the solution to solve the selected at least one business challenge and a projected cost to implement the solution.

15. The computer program product of claim 9, wherein a business challenge for a store is diagnosed by the metrics engine when a value of a retail performance metric of the store is outside a determined range of values.

16. The computer program product of claim 15, wherein the determined range of values is determined based on values of a retail performance metric of one or more other stores of the retail business enterprise.

17. A computer implemented operations system, the operations system configured to present a recommended solution to a business challenge at a retail store, comprising:

a processor;

a display apparatus;

a metrics engine configured to maintain retail performance metrics related to one or more stores of a retail business enterprise, and further configured to diagnose a business challenge in a store when a value of a retail performance metric of the store is outside a range of values;

a knowledge engine configured to maintain information related to a historical business challenge of the retail business enterprise and information related to how the historical business challenge was solved, and further configured to identify one or more solutions to a business challenge diagnosed by the metrics engine, said metrics engine being further configured to analyze trend information in the knowledge engine to identify a developing challenge and upon detecting said developing challenge, analyzing the trend information and formulating a suggestion for proactively addressing said developing challenge; and an operations dashboard configured to display one or more stores of the retail business enterprise and one or more retail performance metrics related to the one or more stores of the retail business enterprise, said operations dashboard further configured to display a business challenge diagnosed by the metrics engine, the business challenge displayed in response to user input selecting one of the one or more stores displayed on the operations dashboard, said operations dashboard further configured to display an identifier for the selected store, said operations dashboard further configured to display one or more solutions to the business challenge developed by the metrics engine after the trend information in the knowledge engine is analyzed by the metrics engine, the one or more solutions displayed in response to user input selecting the business challenge, said operations dashboard further configured to display said one or more retail performance metrics in a first table, to display said business challenge in a second table, and to display said one or more solutions to said business challenge in a third table, and said operations dashboard implemented by the processor and displayed on the display apparatus.

18. The operations system of claim 17, wherein the knowledge engine is further configured to calculate a recommendation score that relates to an expected efficacy of each identified solution.

19. The operations system of claim 18, wherein the recommendation score is calculated based on a projected likelihood of a solution to solve the business challenge.

20. The operations system of claim 18, wherein the recommendation score is calculated based on a projected cost to implement a solution.

* * * * *